US012277399B2

(12) United States Patent
Lee et al.

(10) Patent No.: US 12,277,399 B2
(45) Date of Patent: Apr. 15, 2025

(54) APPARATUS AND METHOD FOR PROCESSING NATURAL LANGUAGE

(71) Applicant: SAMSUNG SDS CO., LTD., Seoul (KR)

(72) Inventors: Hyunjae Lee, Seoul (KR); Bongkyu Hwang, Seoul (KR); Judong Kim, Seoul (KR); Jaewoong Yun, Seoul (KR); Hyunjin Choi, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 325 days.

(21) Appl. No.: 17/968,140

(22) Filed: Oct. 18, 2022

(65) Prior Publication Data

US 2023/0125977 A1   Apr. 27, 2023

(30) Foreign Application Priority Data

Oct. 21, 2021 (KR) .................. 10-2021-0140826

(51) Int. Cl.
*G10L 15/22* (2006.01)
*G06F 40/109* (2020.01)
*G06F 40/284* (2020.01)
*G06F 40/40* (2020.01)

(52) U.S. Cl.
CPC ............ *G06F 40/40* (2020.01); *G06F 40/109* (2020.01); *G06F 40/284* (2020.01)

(58) Field of Classification Search
None
See application file for complete search history.

(56) References Cited

U.S. PATENT DOCUMENTS

| | | | | |
|---|---|---|---|---|
| 9,170,987 | B2* | 10/2015 | Gerhard | G06F 40/103 |
| 11,056,096 | B2* | 7/2021 | Chae | G10L 13/10 |
| 11,321,416 | B2* | 5/2022 | Ferradini | G06F 40/143 |
| 2014/0152671 | A1* | 6/2014 | Listou | G06F 15/0291 |
| | | | | 345/472 |
| 2015/0363410 | A1* | 12/2015 | Hernandez | G06F 16/3346 |
| | | | | 707/767 |
| 2017/0344519 | A1* | 11/2017 | Scott | G06F 40/109 |
| 2019/0147034 | A1* | 5/2019 | Maneriker | G06F 40/253 |
| | | | | 704/9 |
| 2019/0243875 | A1* | 8/2019 | Jain | G06V 30/418 |
| 2020/0034432 | A1* | 1/2020 | Jain | G06F 40/253 |
| 2022/0122582 | A1* | 4/2022 | Elias | G06N 3/045 |
| 2022/0138402 | A1* | 5/2022 | Kraus | G06N 3/08 |
| | | | | 715/269 |
| 2022/0358280 | A1* | 11/2022 | Shirani | G06N 3/045 |
| 2022/0414314 | A1* | 12/2022 | Zhang | G06N 3/0455 |
| 2023/0070390 | A1* | 3/2023 | Weng | G06F 40/103 |

FOREIGN PATENT DOCUMENTS

KR   10-2020-0109914 A   9/2020

* cited by examiner

*Primary Examiner* — Neeraj Sharma
(74) *Attorney, Agent, or Firm* — Sughrue Mion, PLLC

(57) ABSTRACT

An apparatus for processing natural language includes a collection module for collecting a document having style information on text in the document, a preprocessing module for extracting style information from the text of the collected document, and labeling the extracted style information with the text, and a first machine learning module receiving the text labeled with the style information, and predicting a position of a word having the style information in the received text.

23 Claims, 6 Drawing Sheets

FIG. 2

GROWTH ENGINE OF CHAT COMMUNITY

So, why is a chat-based community growing like this?

Above all, ▓▓▓▓▓▓▓▓▓▓▓▓▓ provided by a chat interface plays a major role in the growth thereof. In the chat-based community, answers to my questions may be obtained, and responses to my speech may be obtained in near real time. There is no other communications channel having such a fast feedback loop, other than a direct call. Members may receive answers or opinions about my writing at a much faster rate as compared to previous post-oriented websites. This fast feedback loop creates more communications, so even with a small number of members, the fast feedback loop quickly comes to life, unlike bulletin board-oriented communities. People prefer chatting as a method of communications to the extent that chat interfaces are often described as addictive.

→ *background-color: #f4c216;*

→ *<b> ... </b>*

CLEAR LIMITATIONS AND SOLUTIONS

→ *color: #5c5cb2; font-size: 28pt;*

As a customer channel, group chat includes limitations on the chat interface as it is. There are two main limitations, (1) As the number of members increases, <u>a level of immersion decreases</u>, so that there is a limitation in a quantitative growth of the community, and (2) Since contents in the group chat are not systematically archived, members do not naturally flow thereinto through a search engine.

→ *text-decoration: underline;*

APPARATUS AND METHOD FOR PROCESSING NATURAL LANGUAGE

CROSS-REFERENCE TO RELATED APPLICATION AND CLAIM OF PRIORITY

This application claims the benefit under 35 USC § 119 of Korean Patent Application No. 10-2021-0140826 filed on Oct. 21, 2021 in the Korean Intellectual Property Office, the disclosure of which is incorporated herein by reference in its entirety.

BACKGROUND

1. Field

Disclosed embodiments relate to a technology for processing natural language.

2. Description of Related Art

In a computer science, Natural Language Understanding (NLU) means that a computer receives a sentence composed in natural language (for example, Korean, Japanese, English, or the like) commonly used by humans for communication, and infers an intention of the received sentence. There are various technologies for understanding natural language on a computer, but recently, a technology using an artificial intelligence model based on machine learning has mainly been studied.

Meanwhile, an atypical text analysis technology using a conventional deep learning language model was mainly performed depending only on semantic information of a text. However, documents have various types of information other than text, which often plays a very important role in improving comprehension of documents. For example, underlined or bold text is more likely to contain the most important content in the document.

Therefore, there is a need for a method for inferring important information in a document by using style information of the shape of a character in addition to the dictionary or semantic information of the character of the text.

SUMMARY

Disclosed embodiments are to provide an apparatus and method for processing natural language capable of predicting a position of a word having style information in text of a document.

Disclosed embodiments are to provide an apparatus and method for processing natural language capable of summarizing text content by reflecting style information of text of a document.

According to an aspect of the present disclosure, an apparatus for processing natural language includes a processor, a memory storing one or more programs configured to be executed by the processor, and the one or more programs including instructions for a collection module configured for collecting a document having style information on text in the document, a preprocessing module configured for extracting the style information from the text of the collected document, and labeling the extracted style information with the text, and a first machine learning module configured for receiving the text labeled with the style information, and predicting a position of a word having the style information in the received text.

The style information may include at least one of a text color, size, style, and font.

The preprocessing module may perform the labeling based on a start position and an end position of a portion having style information in the text.

The first machine learning module may include: a tokenization unit generating tokens of a preset unit by performing tokenization on the received text; an encoding unit converting each of the tokens into an embedding vector; a first predicting unit receiving an embedding vector for each of the tokens, and predicting a probability of reaching a start position of the style information in the text from the embedding vector; and a second predicting unit receiving an embedding vector for each of the tokens, and predicting a probability of reaching an end position of the style information in the text from the embedding vector.

The first machine learning module may be trained so that a difference between a value predicted by the first predicting unit and a correct value for the start position of the style information is minimized, and a difference between a value predicted by the second predicting unit and a correct value for the end position of the style information is minimized.

A loss function of an artificial neural network constituting the first machine learning module may be expressed by the following equation by applying Cross Entropy Loss.

$$\text{Loss} = 0.5 * \text{CrossEntropy}(\text{Start}', \text{Start}) + 0.5 * \text{CrossEntropy}(\text{End}', \text{End}) \quad \text{(Equation)}$$

Start': a value predicted by the first predicting unit
Start: a correct value for the start position of style information
End': a value predicted by the second predicting unit
End: a correct value for the end position of style information The first machine learning module may further include a filter unit filtering the embedding vectors based on the value predicted by the first predicting unit and the value predicted by the second predicting unit.

The filter unit may extract, among the embedding vectors, an embedding vector, equal to or greater than a preset threshold value, as a style-related embedding vector based on the value predicted by the first predicting unit and the value predicted by the second predicting unit.

The apparatus for processing natural language may further include a second machine learning module summarizing text in an input document using the style-related embedding vector.

The second machine learning module may include: a tokenization unit generating tokens of a preset unit by performing tokenization on received text; an encoding unit converting each of the tokens into an embedding vector; a summing unit adding the style-related embedding vector to an embedding vector corresponding thereto among vectors output from the encoding unit; and a decoding unit outputting a summary of the text based on the embedding vector output from the summing unit.

The summing unit may transmit an embedding vector, not corresponding to the style-related vector among the embedding vectors output from the encoding unit, to the decoding unit, and add an embedding vector, corresponding to the style-related vector among the embedding vectors output from the encoding unit and then transmit the same to the decoding unit.

The encoding unit and the decoding unit of the second machine learning module may be initialized with a weight value of the trained encoding unit of the first machine learning module.

According to another embodiment of the present disclosure, an apparatus for processing natural language, includes: a collection module collecting a document having style information in text of the document; a preprocessing module extracting style information from the text of the collected document, and labeling the extracted style information matched the text; a first machine learning module receiving the text labeled with the style information, and predicting a position of a word having the style information in the received text; and a second machine learning module summarizing the received text in a document based on a result predicted by the first machine learning module.

According to an embodiment of the present disclosure, a method for processing natural language, includes: an operation of, in a collection module, collecting a document having style information on text of a document; an operation of, in a preprocessing module, of extracting style information from the text of the collected document, and labeling the extracted style information matched the text; and an operation of, in a first machine learning module, of receiving the text labeled with the style information, and predicting a position of a word having the style information in the received text.

The style information may include at least one of a text color, size, style, and font.

The labeling operation may perform the labeling based on a start position and an end position of a portion having style information in the text.

The operation of predicting of the position of the word may include: an operation of, in a tokenization unit, performing tokenization on received text to generate tokens of a preset unit; an operation of, in an encoding unit, converting each of the tokens into an embedding vector; an operation of, in a first predicting unit, receiving an embedding vector for each of the tokens, and predicting a probability of reaching a start position of the style information in the text from the embedding vector; and an operation of, in a second predicting unit, receiving an embedding vector for each of the tokens, and predicting a probability of reaching an end position of the style information in the text from the embedding vector.

The operation of predicting the position of the word may further include an operation of, in the first learning machine module, learning so that a difference between a value predicted by the first predicting unit and a correct value for the start position of the style information is minimized, and a value predicted by the second predicting unit and a correct value for the end position of the style information is minimized.

The method for processing natural language may further include an operation of, in a filter unit, filtering the embedding vectors based on the value predicted by the first predicting unit and the value predicted by the second predicting unit.

The filtering operation may further include an operation of, in the filter unit, extracting an embedding vector, equal to or greater than a preset threshold value among the embedding vectors based on the value predicted by the first predicting unit and the value predicted by the second predicting unit as a style-related embedding vector.

The method for processing natural language may further include an operation of, in a second machine learning module, summarizing the received text in a document by using the style-related embedding vector.

The operation of summarizing the text may include: an operation of, in a tokenization unit, performing tokenization on received text to generate tokens of a preset unit; an operation of, in an encoding unit, converting each of the tokens into an embedding vector; an operation of, in a summing unit, adding the style-related embedding vector to an embedding vector corresponding thereto among vectors output from the encoding unit; and an operation of, in a decoding unit, outputting a summary of the text based on the embedding vector output from the summing unit.

The method for processing natural language may further include: an operation of, in the summing unit, transmitting an embedding vector, not corresponding to the style-related vector among the embedding vectors output from the encoding unit, to the decoding unit; and an operation of, in the summing unit, adding an embedding vector, corresponding to the style-related vector among the embedding vectors output from the encoding unit and then transmitting the same to the decoding unit.

BRIEF DESCRIPTION OF THE DRAWINGS

The above and other aspects, features, and advantages of the present disclosure will be more clearly understood from the following detailed description, taken in conjunction with the accompanying lead-outs, in which:

FIG. 2 is a diagram illustrating a state in which style information in text of a document is extracted based on an HTML tag according to an embodiment of the present disclosure;

DETAILED DESCRIPTION

Hereinafter, embodiments in the present disclosure will be described with reference to the accompanying drawings. The disclosure may, however, be exemplified in many different forms and should not be construed as being limited to the specific embodiments set forth herein.

In describing the embodiments of the present disclosure, if it is determined that the detailed description of the known technology related to the present disclosure may unnecessarily obscure the gist of the present disclosure, the detailed description thereof will be omitted. In addition, the terms to be described later are terms defined in consideration of functions in the present disclosure, which may vary according to intentions or customs of users and operators. Therefore, the definition should be made based on the content throughout this specification. The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

In addition, terms such as first and second may be used to describe various components, but the components should not be limited by the terms. The above terms may be used for the purpose of distinguishing one component from other components. For example, without departing from the scope of the present disclosure, a first component may be referred to as a second component, and similarly, the second component may also be referred to as a first component.

Figure 1:
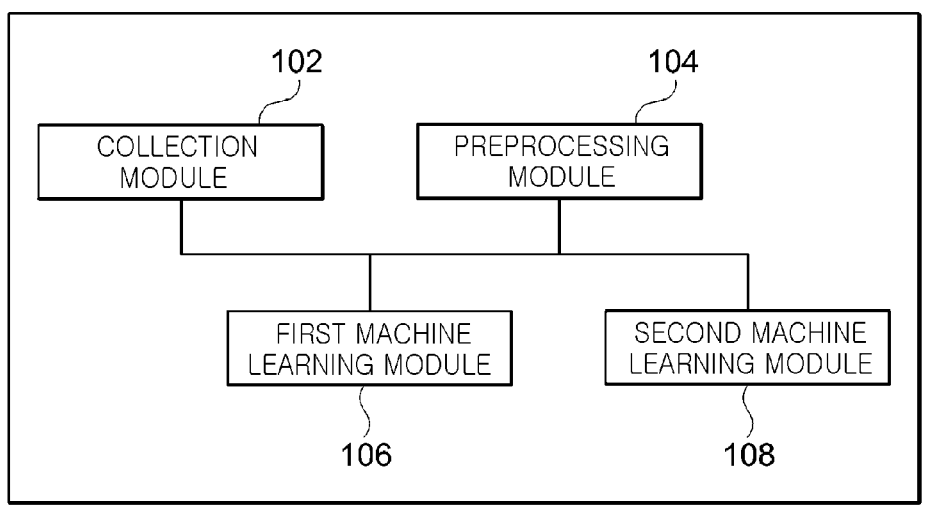
FIG. 1 is a block diagram illustrating the configuration of a machine learning-based apparatus for processing natural language according to an embodiment of the present disclosure.

FIG. 1 is a block diagram illustrating the configuration of a machine-learning based apparatus for processing natural language according to an embodiment of the present disclosure.

Referring to FIG. 1, the apparatus for processing natural language 100 may include a collection module 102, a preprocessing module 104, a first machine learning module 106, and a second machine learning module 108.

The collection module 102 collects documents including text. The collection module 102 may collect documents for learning machine learning models provided in the first machine learning module 106 and the second machine learning module 108. In an exemplary embodiment, the collection module 102 may collect a large amount of hypertext markup language (HTML) documents, eXtensible Markup (XML) documents, or the like through web crawling. The collection module 102 may collect a document having style information in text in the document.

Specifically, the collection module 102 may collect various Uniform Resource Locators (URLs), access each URL through a communication network, and collect an HTML document constituting a web page of the corresponding URL. The collection module 102 may store the collected HTML document.

As described above, when web documents are collected through web crawling and used as learning data, a separate expert does not need to perform style work to display an important content in the document, so that it is possible to reduce time and costs required for learning the first machine learning module 106 and the second machine learning module 108.

The preprocessing module 104 may extract style information from the text in the document collected by the collection module 102. Here, the style information refers to an external shape of the text, and the style information may be as follows.

1) Text color: a background color of the text and a color of the text itself
2) Text size: a size of the text expressed in a font-size
3) Text style: information on whether the text is underlined or bold-expressed
4) Text font: information on whether to use a font different from that of other text in the document When the document collected by the collection module 102 is an HTML (or XML) document having a tag, the preprocessing module 104 may extract style information from the text in the document by extracting an HTML code from the HTML document and performing a tagging operation. FIG. 2 is a diagram illustrating a state in which style information of text in a document is extracted based on an HTML tag according to an embodiment of the present disclosure.

The preprocessing module 104 may label the extracted style information by matching the same with the corresponding text. In an exemplary embodiment, the preprocessing module 104 may perform labeling based on a position (e.g., start position and end position) of a portion having style information in text.

For example, in a sentence "오늘 날씨는 흐리고 소나기가 내리겠습니다 (It is cloudy and it will rain today)," a word "소나기 (rain)" has style information, which is underlined, and in the sentence, a start position of the word "소나기 (rain)" is the $12^{th}$, and an end position of the word "소나기 (rain)" is the $14^{th}$, so that the preprocessing module 104 may perform labeling for the corresponding sentence as {12, 14}.

The first machine learning module 106 may perform an operation of predicting a position of a word having style information in text in a received document. That is, the first machine learning module 106 may include an artificial neural network model, which is trained to predict the position of a word having style information in the received text in the document.

Figure 3:
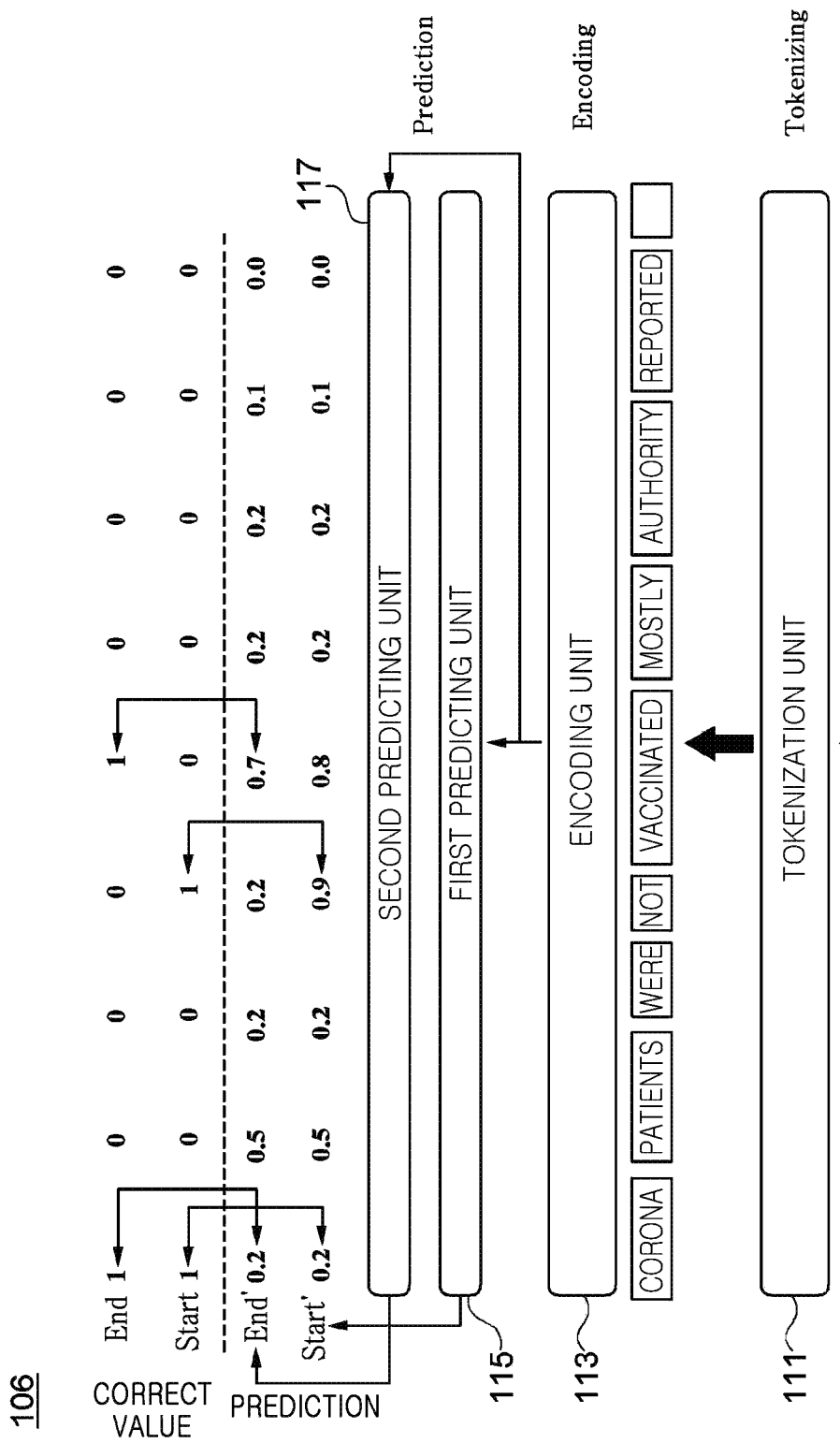
FIG. 3 is a diagram illustrating the configuration of a first machine learning module in an embodiment of the present disclosure.

FIG. 3 is a diagram illustrating the configuration of the first machine learning module 106 in an embodiment of the present disclosure. Referring to FIG. 3, the first machine learning module 106 may include a tokenization unit 111, an encoding unit 113, a first predicting unit 115, and a second predicting unit 117.

Here, the tokenization unit 111, the encoding unit 113, the first predicting unit 115, and the second predicting unit 117 may be formed of an artificial neural network. In this case, the tokenization unit 111, the encoding unit 113, the first predicting unit 115, and the second predicting unit 117 may be comprised of one artificial neural network or several artificial neural networks.

The tokenization unit 111 may perform tokenization on the received text to generate tokens of a preset unit. In an exemplary embodiment, the tokenization unit 111 may perform tokenization on the received text in word units to generate tokens.

As illustrated in FIG. 3, when the received text is "The authority reported that most of the corona confirmed patients were unvaccinated," the tokenization unit 111 may perform tokenization on the received text into units of each word, such as "corona," "confirmed," "most)," "vaccine," "unvaccinated," "were," "authority," "reported," to generate tokens. Here, the style information of the corresponding text is only used as a label for comparing a prediction value and a correct value, and is not input to the first machine learning module 106.

The encoding unit 113 may convert respective tokens output from the tokenization unit 111 into an embedding vector. The embedding vector may be obtained by converting each token into a vector representation of a preset dimension. The encoding unit 113 may generate an embedding vector of a preset dimension from each token by using various known word embedding techniques. For example, the encoding unit 113 may use an artificial neural network model such as Long Short Term Memory (LSTM), Gated Recurrent Unit (GRU), Bidirectional Encoder Representations from Transformers (BERT), etc., but an embodiment thereof is not limited thereto.

The first predicting unit 115 may receive an embedding vector for each token from the encoding unit 113. The first predicting unit 115 may be trained to predict a probability of reaching a start position of style information in the corresponding text from each received embedding vector. That is, the first predicting unit 115 may be trained to predict how likely it is that a word corresponding to each received embedding vector reaches a start position of a portion having style information in the corresponding text. The first predicting unit 115 may be a neural network layer including a linear layer.

The second predicting unit 117 may receive an embedding vector for each token from the encoding unit 113. The second predicting unit 117b may be trained to predict a probability of reaching an end position of style information in the corresponding text from each received embedding vector. That is, the second predicting unit 117 may be trained to predict how likely it is that a word corresponding to each received embedding vector reaches an end position of a portion having style information in the corresponding text. The second predicting unit 117 may be a neural network layer including a linear layer.

Here, it can be seen that the first predicting unit 115 predicts a probability of the start position of the style information in the text as 0.2, 0.5, 0.2, 0.9, 0.8, 0.2, 0.1, and 0.0, respectively, for an embedding vector corresponding to "corona," "confirmed," "most," "vaccine," "unvaccinated," "were," "authority," "reported."

It can be seen that the second predicting unit 115 predicts a probability of the end position of the style information in the text as 0.2, 0.5, 0.2, 0.2, 0.7, 0.2, 0.2, 0.1, and 0.0, respectively, for an embedding vector corresponding to "corona," "confirmed," "most," "vaccine," "unvaccinated," "were," "authority," "reported."

In addition, a correct value of the start position of the style information for "corona," "confirmed," "mostly," "vaccine," "unvaccinated," "was," "authority," "reported" is 1 (true), 0 (false), 0, 1, 0, 0, 0, 0, and a correct value of the end position thereof is 1 (true), 0 (false), 0, 0, 1, 0, 0, 0, 0.

The first machine learning module 106 may be trained so that a difference between a value predicted by the first predicting unit 115 for each embedding vector and a correct value for a start position of the style information is minimized and a difference between a value predicted by the second predicting unit 117 for each embedding vector and a correct value for an end position of the style information is minimized. In this case, a loss function of an artificial neural network constituting the first machine learning module 106 may be expressed as in Equation 1 below by applying Cross Entropy Loss.

$$\text{Loss} = 0.5 * \text{CrossEntropy}(\text{Start}', \text{Start}) + 0.5 * \text{CrossEntropy}(\text{End}', \text{End}) \quad \text{(Equation 1)}$$

Start': a value predicted by the first predicting unit
Start: a correct value for a start position of style information
End': a value predicted by the second predicting unit
End: a correct value for an end position of style information The second machine learning module 108 may perform a task of summarizing important content among received text in a document. The second machine learning module 108 may have an artificial neural network model that is trained to summarize the meaning of the received text in the document. In this case, the second machine learning module 108 may be trained to summarize the text by reflecting the style information in the text based on the information output from the pre-trained first machine learning module 106. For example, the second machine learning module 108 may consist of an artificial neural network model, such as a sequence-to-sequence model.

Figure 4:
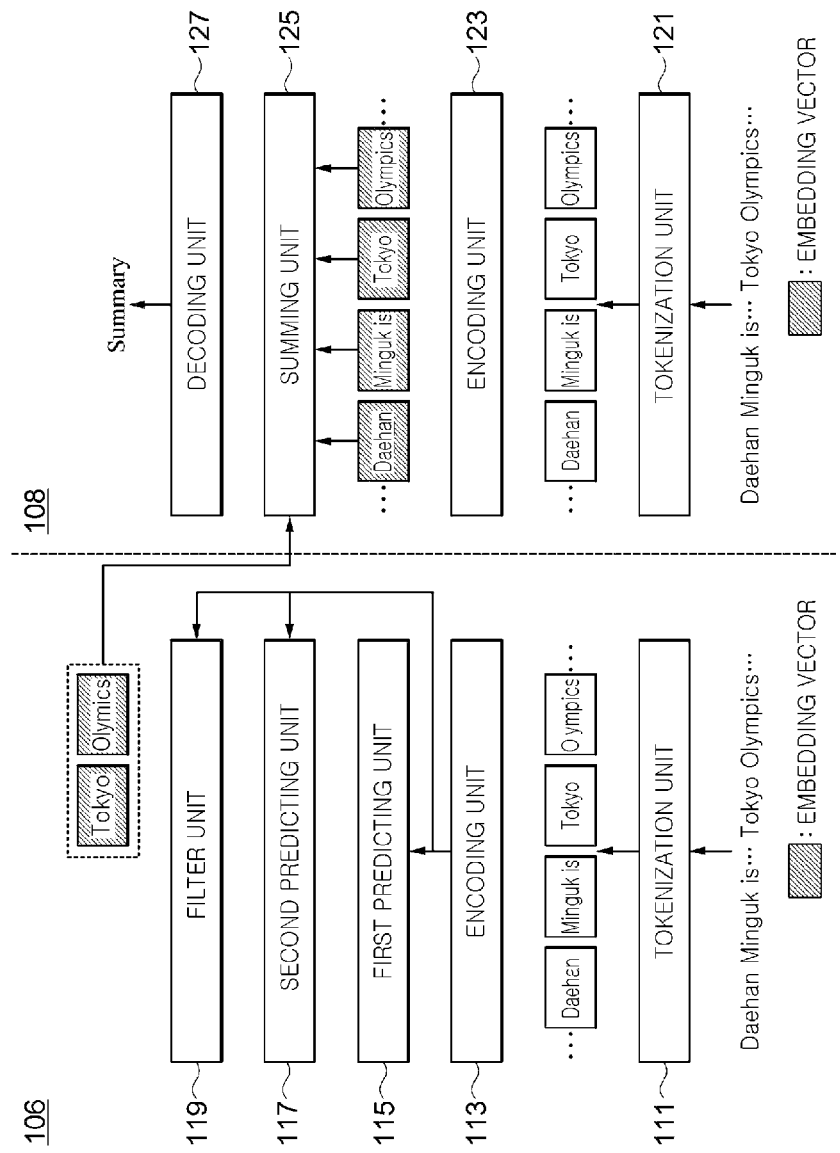
FIG. 4 is a diagram schematically illustrating a process of learning a second machine learning module in an embodiment of the present disclosure.

FIG. 4 is a diagram schematically illustrating a process of learning a second machine learning module 108 in an embodiment of the present disclosure. Referring to FIG. 4, the first machine learning module 106 may further include a filter unit 119, in addition to a tokenization unit 111, an encoding unit 113, a first predicting unit 115, and a second predicting unit 117.

That is, the first machine learning module 106 may be trained to perform a task of predicting a position of a word having style information in a text in a received document, and then further include a filter unit 119 in a process of training the second machine learning module 180.

Here, a case in which the second machine learning module 108 summarizes text " . . . Daehan Minguk is . . . Tokyo Olympics . . . " will be described. The text " . . . Daehan Minguk is . . . Tokyo Olympics . . . " is also input to the first machine learning module 106.

The tokenization unit 111 may generate tokens by tokenizing respective words of the text. The encoding unit 113 may convert the respective tokens output from the tokenization unit 111 into an embedding vector. The first predicting unit 115 may output a value (hereinafter, referred to as a first prediction value) predicting a probability of reaching the start position of the style information in the corresponding text from each embedding vector. The second predicting unit 117 may output a value (hereinafter, referred to as a second prediction value) predicting a probability of reaching the end position of the style information in the corresponding text from each embedding vector.

The filter unit 119 may filter embedding vectors based on the first prediction value and the second prediction value. The filter unit 119 may transmit a portion of the embedding vectors to the second machine learning module 108 based on the first prediction value and the second prediction value. In an exemplary embodiment, when an average value of the first prediction value and the second prediction value is equal to or greater than a preset threshold value, the filter unit 119 may transmit the corresponding embedding vector to the second machine learning module 108.

For example, when the average value of the first prediction value and the second prediction value for an embedding vector corresponding to "Tokyo" and "Olympic" among embedding vectors such as "Daehan," "Minguk," "Tokyo," "Olympics," and the like, is equal to or greater than a preset threshold value, the filter unit 119 may transmit the embedding vectors corresponding to "Tokyo" and "Olympics" to the second machine learning module 108.

Here, since the embedding vector in which the average value of the first prediction value and the second prediction value is equal to or greater than a preset threshold value has a high probability that the corresponding word has style information in the text, it may be referred to as a "style-related embedding vector." That is, the filter unit 119 may extract, among the embedding vectors, the embedding vector in which the average value of the first prediction value and the second prediction value is equal to or greater than a preset threshold value as a style-related embedding vector.

Meanwhile, the second machine learning module 108 may include a tokenization unit 121, an encoding unit 123, a summing unit 125, and a decoding unit 127. Here, the tokenization unit 121, the encoding unit 123, the summing unit 125, and the decoding unit 127 may be formed of an artificial neural network. In this case, the tokenization unit 121, the encoding unit 123, the summing unit 125, and the decoding unit 127 may be comprised of one artificial neural network or several artificial neural networks.

The tokenization unit 121 may generate tokens of a preset unit by performing tokenization on received text. In an exemplary embodiment, the tokenization unit 111 may generate tokens by performing tokenization on the received text in word units. For example, the tokenization unit 121 may generate tokens by performing tokenization on the received text into "Daehan," "Minguk," "Tokyo," "Olympics," and the like.

The encoding unit 123 may convert respective tokens output from the tokenization unit 121 into an embedding vector.

The summing unit 125 may add an embedding vector output from the encoding unit and a style-related embedding vector transmitted from the first machine learning module 106. In this case, the summing unit 125 may add the style-related embedding vector transmitted from the first machine learning module 106 to an embedding vector corresponding thereto, among the embedding vectors output from the encoding unit 123, respectively.

For example, when embedding vectors corresponding to "Tokyo" and "Olympics" are transmitted from the first machine learning module 106, the summing unit 125 may respectively add the embedding vectors corresponding to "Tokyo" and "Olympics" transmitted from the first machine learning module 106 to embedding vectors corresponding to "Tokyo" and "Olympics" among encoding vectors output from the encoding unit 123, respectively.

The summing unit 125 may perform normalization after respectively adding the style-related embedding vector to an embedding vector corresponding thereto among the embedding vectors output from the encoding unit 123.

The summing unit 125 may transmit an embedding vector, not corresponding to the style-related embedding vector among the embedding vectors output from the encoding unit 123 to the decoding unit 127 as is. In addition, the summing unit 125 may transmit an embedding vector, corresponding to the style-related embedding vector among the embedding vectors output from the encoding unit 123 to the decoding unit 127 after adding the same to the style-related embedding vector.

The decoding unit 127 may be trained to output a summary of the text based on the embedding vector output from the summing unit 125. In this case, an embedding vector (that is, a style-related vector) in which an average value of the first prediction value and the second prediction value is equal to or greater than a preset threshold value is added to the embedding vector corresponding thereto in the summing unit 125 and then input to the decoding unit 127, so that it is possible to output a summary of the text by reflecting the words having style information in the text. The decoding unit 127 may be implemented as a known artificial neural network performing an extractive summary task.

Meanwhile, weight values (or parameter values) of the encoding unit 123 and the decoding unit 127 may be randomly initialized, but an embodiment of the present disclosure is not limited thereto and may also be initialized to a weight value of the encoding unit 113 of the first machine learning module 106. In this case, since the weight value of the encoding unit 113 is a value trained to distinguish between a portion having style information in the text and a portion not having style information, when a weight value of the encoding unit 113 is used rather than a randomized initialized value, it is possible to more efficiently output a summary of the text.

In the disclosed embodiments, the first machine learning module 106 is trained to predict a position of a portion having style information in the text, and the second machine learning module 108 uses the same to summarize the text content, so that it is possible to identify important keywords and sentences in the text, and as a result, it is possible to improve summary performance of a document.

In this specification, a module may mean a functional and structural combination of hardware for carrying out the technical idea of the present disclosure and software for driving the hardware. For example, the "module" may mean a logical unit of a predetermined code and a hardware resource for executing the predetermined code, and does not necessarily mean physically connected code or a single type of hardware.

Figure 5:
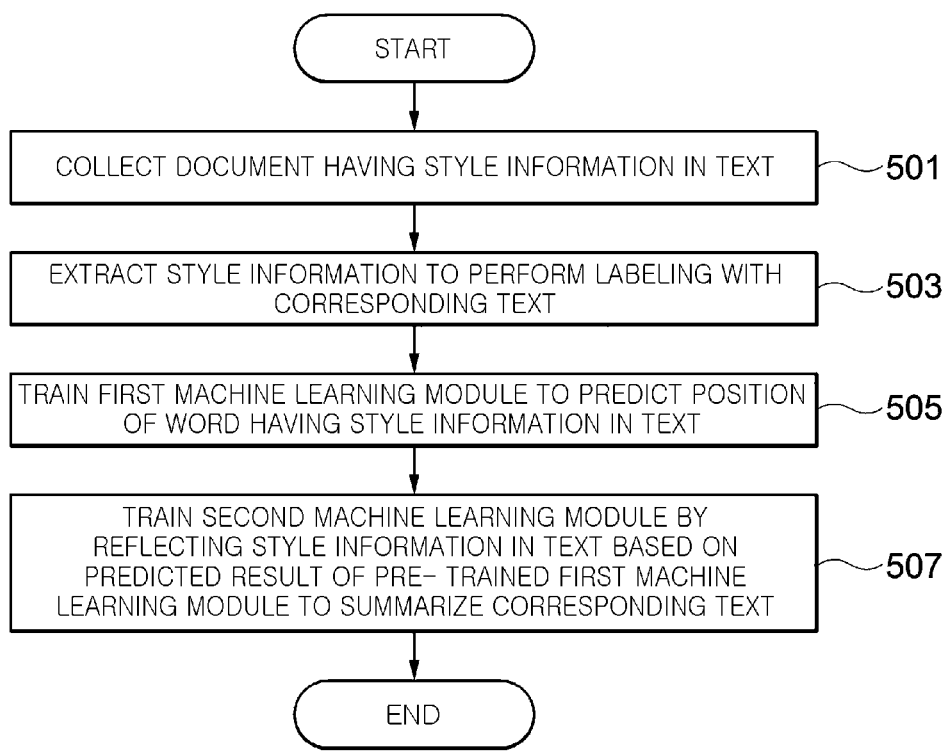
FIG. 5 is a flowchart illustrating a method for processing natural language according to an embodiment of the present disclosure.

FIG. 5 is a flowchart illustrating a method for processing natural language according to an embodiment of the present disclosure. The method illustrated in FIG. 5 may be performed, for example, by the apparatus for processing natural language 100 illustrated in FIG. 1.

Referring to FIG. 5, the apparatus for processing natural language 100 collects a document having style information in text (501).

In an exemplary embodiment, the apparatus for processing natural language 100 may collect web documents having tags, such as HTML documents, through web crawling.

Thereafter, the apparatus for processing natural language 100 extracts style information from the text in the collected document and performs labeling with the corresponding text (503).

For example, the apparatus for processing natural language 100 may extract style information from text in a document, and perform labeling based on a position of a portion having style information in the text.

Thereafter, the apparatus for processing natural language 100 trains the first machine learning module 106 to predict a position of a word having style information in text in a document (505).

The apparatus for processing natural language 100 may train the first machine learning module 106 by using a document labeled with style information as learning data. In this case, the apparatus for processing natural language 100 may train the first machine learning module 106 to predict a start position and an end position of a portion having style information in the received text.

Thereafter, the apparatus for processing natural language 100 trains the second machine learning module 108 to summarize important contents of text in a document (507).

The apparatus for processing natural language 100 may train the second machine learning module 108 by reflecting style information in the text based in the information (style-related embedding vector) output from the pre-trained first machine learning module 106 to summarize the corresponding text.

Meanwhile, in the flowchart illustrated in FIG. 5, the method is described by dividing the method into a plurality of steps, but at least a portion of the steps may be performed in a different order, be performed in combination with other steps, be omitted, be performed by being divided into detailed steps, or be performed by adding one or more steps not illustrated.

Figure 6:
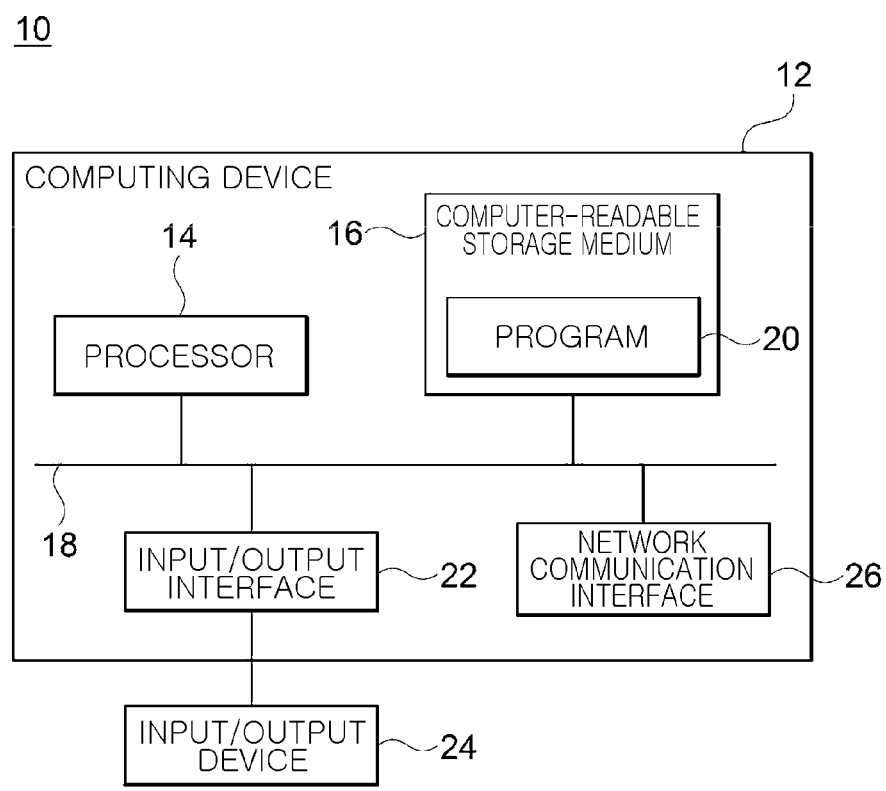
FIG. 6 is a block diagram illustrating and describing a computing environment including a computing device suitable for use in exemplary embodiments.

FIG. 6 is a block diagram illustrating and describing a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In an embodiment, the computing device 12 may be an apparatus for processing natural language 100.

The computing device 12 includes at least one processor 14, a computer-readable storage medium 16, and a communication bus 18. The processor 14 may cause the computing device 12 to operate in accordance with the exemplary embodiments described above. For example, the processor 14 may execute one or more programs stored in the computer-readable storage medium 16. The one or more programs may include one or more computer-executable instructions and when the computer-executable instructions are executed by the processor 14, the computer-executable instructions may be configured to cause the computing device 12 to perform operations in accordance with the exemplary embodiment.

The computer-readable storage medium 16 is configured to store computer-executable instructions or program code, program data, and/or other suitable form of information. The program 20 stored in the computer-readable storage medium 16 includes a set of instructions executable by the processor 14. In an embodiment, the computer-readable storage medium 16 may include a memory (volatile memory such as a random access memory, non-volatile memory, or a suitable combination thereof), one or more magnetic disk storage devices, optical disk storage devices, flash memory devices, or any other form of storage medium that can be accessed by the computing device 12 and stored for desired information, or a suitable combination thereof.

The communication bus 18 interconnects various other components of computing device 12, including the processor 14 and computer-readable storage medium 16.

The computing device 12 may also include one or more input/output interfaces 22 and one or more network communication interfaces 26 providing an interface for one or more input/output devices 24. The input/output interface 22 and the network communication interface 26 are connected to the communication bus 18. The input/output device 24 may be connected to other components of computing device 12 via input/output interface 22. The exemplary input/output device 24 may include a pointing device such as a mouse, a trackpad, or the like, a keyboard, a touch input device such as a touch pad, a touch screen, or the like, input devices such as voice or sound input devices, various types of sensor devices and/or imaging devices, and/or output devices such as display devices, printers, speakers and/or network cards. The exemplary input/output device 24 may be included in the computing device 12 as a component constituting the computing device 12, and may be connected to the computing device 12 as a separate device distinct from the computing device 12.

As set forth above, according to the disclosed embodiments, in a first machine learning module, by training to predict a position of a portion having style information in text, and in a second machine learning module, by using the same to summarize text content, it is possible to identify important keywords and sentences in the text, and as a result, summary performance of the document may be improved.

While the example embodiments have been illustrated and described above, it will be apparent to those skilled in the art that modifications and variations could be made without departing from the scope of the present invention as defined by the appended claims.

What is claimed is:

1. An apparatus for processing natural language, the apparatus comprising:
    a processor;
    a memory storing one or more programs configured to be executed by the processor; and
    the one or more programs including instructions for:
    a collection module configured for collecting a document having style information on text in the document, the style information indicating a style that has been applied to the text in the document;
    a preprocessing module configured for extracting the style information from the text of the collected document, and labeling the text with a position of a portion of the text to which the extracted style information has been applied; and
    a first machine learning module configured for receiving the text labeled with the position of the portion of the text to which the extracted style information has been applied, and being trained, by using the labeled text as learning data, to predict a position of a word having the style information in the received text.

2. The apparatus of claim 1, wherein the style information comprises at least one of a text color, a size, a shape, and a font that has been applied to the text.

3. The apparatus of claim 1, wherein the preprocessing module is configured to perform the labeling based on a start position and an end position of the portion of the text to which the extracted style information has been applied.

4. The apparatus of claim 3, wherein the first machine learning module comprises:
    a first tokenization unit configured for generating first tokens of a preset unit by performing tokenization on the received text;
    a first encoding unit configured for converting each of the first tokens into a first embedding vector;
    a first predicting unit configured for receiving the first embedding vector for each of the first tokens and predicting a probability of reaching the start position of the portion of the text to which the style information has been applied from the first embedding vector; and
    a second predicting unit configured for receiving the first embedding vector for each of the first tokens and predicting a probability of reaching the end position of the portion of the text to which the style information has been applied from the first embedding vector.

5. The apparatus of claim 4, wherein the first machine learning module is configured to be trained so that a difference between a value predicted by the first predicting unit and a correct value for the start position of the portion of the text to which the style information has been applied is minimized, and a difference between a value predicted by the second predicting unit and a correct value for the end position of the portion of the text to which the style information has been applied is minimized.

6. The apparatus of claim 5, wherein a loss function of an artificial neural network constituting the first machine learning module is expressed by the following equation by applying Cross Entropy Loss:

$$\text{Loss}=0.5*\text{CrossEntrophy}(\text{Start}',\text{Start})+0.5*\text{CrossEntropy}(\text{End}',\text{End}) \quad [\text{Equation}]$$

where Start' is the value predicted by the first predicting unit;
Start is the correct value for the start position of the portion of the text to which the style information has been applied;
End' is the value predicted by the second predicting unit; and
End is the correct value for the end position of the portion of the text to which the style information has been applied.

7. The apparatus of claim 5, wherein the first machine learning module further comprises:

a filter unit configured for filtering first embedding vectors based on the value predicted by the first predicting unit and the value predicted by the second predicting unit.

8. The apparatus of claim 7, wherein the filter unit extracts an embedding vector, as a style-related embedding vector, equal to or greater than a preset threshold value, among the first embedding vectors, based on the value predicted by the first predicting unit and the value predicted by the second predicting unit.

9. The apparatus of claim 8, further comprising:
a second machine learning module configured for summarizing the received text by using the style-related embedding vector.

10. The apparatus of claim 9, wherein the second machine learning module comprises:
a second tokenization unit configured for generating second tokens of a preset unit by performing tokenization on the received text;
a second encoding unit configured for converting each of the second tokens into a second embedding vector;
a summing unit configured for adding the style-related embedding vector to a second embedding vector corresponding thereto among the second vectors output from the second encoding unit and outputting the second embedding vector to which the style-related embedding vector is added; and
a decoding unit configured for outputting a summary of the text based on the outputted second embedding vector to which the style-related embedding vector is added.

11. The apparatus of claim 10, wherein the summing unit is configured to:
transmit the second embedding vector, not corresponding to the style-related vector, among second embedding vectors output from the second encoding unit, to the decoding unit;
add the second embedding vector, corresponding to the style-related vector, among the second embedding vectors output from the second encoding unit with the style-related embedding vector; and
then transmit the second embedding vector, to which the style-related embedding vector is added, to the decoding unit.

12. The apparatus of claim 11, wherein the second encoding unit and the decoding unit of the second machine learning module are initialized to a weight value of the learned first encoding unit of the first machine learning module.

13. An apparatus for processing natural language, the apparatus comprising:
a processor;
a memory storing one or more programs configured to be executed by the processor; and
the one or more programs including instructions for:
a collection module configured for collecting a document having style information on text in the document, the style information indicating a style that has been applied to the text in the document;
a preprocessing module for extracting the style information from the text of the collected document, and labeling the text with a position of a portion of the text to which the extracted style information has been applied;
a first machine learning module configured receiving the text labeled with the position of the portion of the text to which the extracted style information has been applied, and being trained, by using the labeled text as learning data, to predict a position of a word having the style information in the received text; and
a second machine learning module configured for summarizing the received text in the document based on a result predicted by the first machine learning module.

14. A method for processing natural language, the method performed by an apparatus comprising a collection module, a preprocessing module and a first machine learning module, the method comprising:
in the collection module, an operation of collecting a document having style information on text in the document, the style information indicating a style that has been applied to the text in the document;
in the preprocessing module, an operation of extracting the style information from the text of the collected document, and labeling the text with a position of a portion of the text to which the extracted style information has been applied; and
in the first machine learning module, an operation of receiving the text labeled with the position of the portion of the text to which the extracted style information has been applied, and being trained, by using the labeled text as learning data, to predict a position of a word having the style information in the received text.

15. The method of claim 14, wherein the style information comprises at least one of a text color, a size, a shape, and a font that has been applied to the text.

16. The method of claim 14, wherein the labeling comprises labeling the extracted style information with the text, based on a start position and an end position of a portion of the text to which the style information has been applied.

17. The method of claim 16, wherein the first machine learning module comprises a first tokenization unit, a first encoding unit, a first predicting unit and a second predicting unit; and
the operation of being trained comprises
an operation, in the first tokenization unit, of generating first tokens of a preset unit by performing tokenization on the received text;
an operation, in the first encoding unit, of converting each of the first tokens into a first embedding vector;
an operation, in the first predicting unit, of receiving the first embedding vector for each of the first tokens and predicting a probability of reaching the start position of the portion of the text to which the style information has been applied the first embedding vector; and
an operation, in the second predicting unit, of receiving the first embedding vector for each of the first tokens and predicting a probability of reaching the end position of the portion of the text to which the style information has been applied from the first embedding vector.

18. The method of claim 17, wherein the operation of being trained further comprises an operation, in the first machine learning module, of being trained so that a difference between a value predicted by the first predicting unit and a correct value for the start position of the portion of the text to which the style information has been applied is minimized and a difference between a value predicted by the second predicting unit and a correct value for the end position of the portion of the text to which the style information has been applied is minimized.

19. The method of claim 18, further comprising:
an operation, in a filtering unit, of filtering first embedding vectors based on the value predicted by the first predicting unit and the value predicted by the second predicting unit.

20. The method of claim 19, wherein the operation of filtering comprises an operation, in the filtering unit, of extracting an embedding vector, as a style-related embedding vector, equal to or greater than a preset threshold value, among the embedding vectors.

21. The method of claim 20, further comprising:
an operation, in a second machine learning module, of summarizing the received text by using the style-related embedding vector.

22. The method of claim 21, wherein the second machine learning module comprises a second tokenization unit, a second encoding unit, a summing unit, and a decoding unit; and
the operation of summarizing the text, comprises:
an operation of, in the second tokenization unit, generating second tokens of a preset unit by performing tokenization on the received text;
an operation of, in the second encoding unit, converting each of the second tokens into a second embedding vector;
an operation of, in the summing unit, adding the style-related embedding vector to the second embedding vector corresponding thereto, among second embedding vectors output from the second encoding unit and outputting the second embedding vector to which the style-related embedding vector is added; and
an operation of, in the decoding unit, outputting a summary of the text based on the outputted second embedding vector to which the style-related embedding vector is added.

23. The method of claim 22, further comprising:
an operation of, in the summing unit, transmitting the embedding vector, not corresponding to the style-related vector among the second embedding vectors output from the second encoding unit, to the decoding unit; and
an operation of, in the summing unit, adding the second embedding vector, corresponding to the style-related vector, among the second embedding vectors output from the second encoding unit, with the style-related embedding vector, and then transmitting the second embedding vector, to which the style-related embedding vector is added, to the decoding unit.

* * * * *